Nov. 12, 1963  L. E. BECKER  3,110,469
PUSH BUTTON ACTUATORS FOR FLUSH VALVES
Original Filed Feb. 26, 1959

INVENTOR.
LYMAN BECKER
BY
ATTORNEY

United States Patent Office 3,110,469
Patented Nov. 12, 1963

3,110,469
PUSH BUTTON ACTUATORS FOR
FLUSH VALVES
Lyman E. Becker, 1012 S. 33rd St., Milwaukee, Wis.
Original application Feb. 26, 1959, Ser. No. 795,790, now Patent No. 3,055,630, dated Sept. 25, 1962. Divided and this application Feb. 13, 1961, Ser. No. 89,605
1 Claim. (Cl. 251—45)

This application is a divisional application of my application Serial No. 795,790 now Patent No. 3,055,630, filed in the United States Patent Office on February 26, 1959.

My invention relates to valves, and more particularly to valves of the type using the pressure of a fluid to seat the valve and with a relief valve associated therewith so as to diminish the pressure from time to time so as to open the valve, such valves being used in combination with plumbing fixtures or the like.

Many valves of the differential pressure type use a second valve to relieve the pressure on the valve closing member to thereby diminish the valve member closing force and open the valve. Valves of this general type oftentimes have a valve closing member in the form of a diaphragm or piston which is subjected to the pressure of the fluid passed through the valve in such fashion that one side of the valve closing member is subjected to the pressure from the inlet to the valve in a valve opening direction while the other side of the member is subjected to the same pressure but over a relatively larger area so that the closing force exerted on the member may from time to time exceed the opening forces.

The present invention is directed to simple and efficient means for operating valves of this general class and is particularly concerned with improvements which facilitate the maintenance of the valve in an open condition for a preselected interval of time.

The primary object of the invention is to provide simple and efficient operating facilities for the relief valves of the foregoing type.

Figure 1:
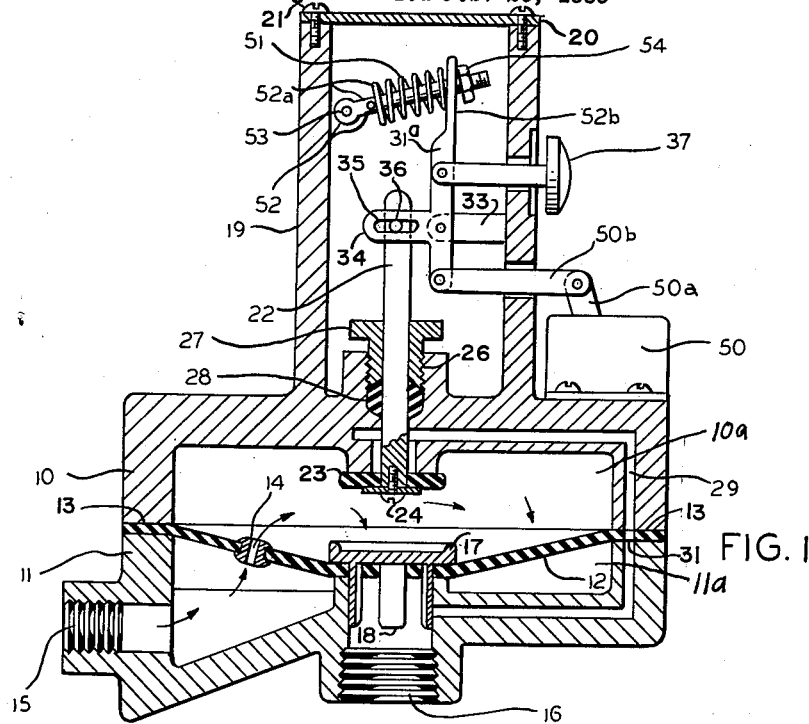
Figure 2:
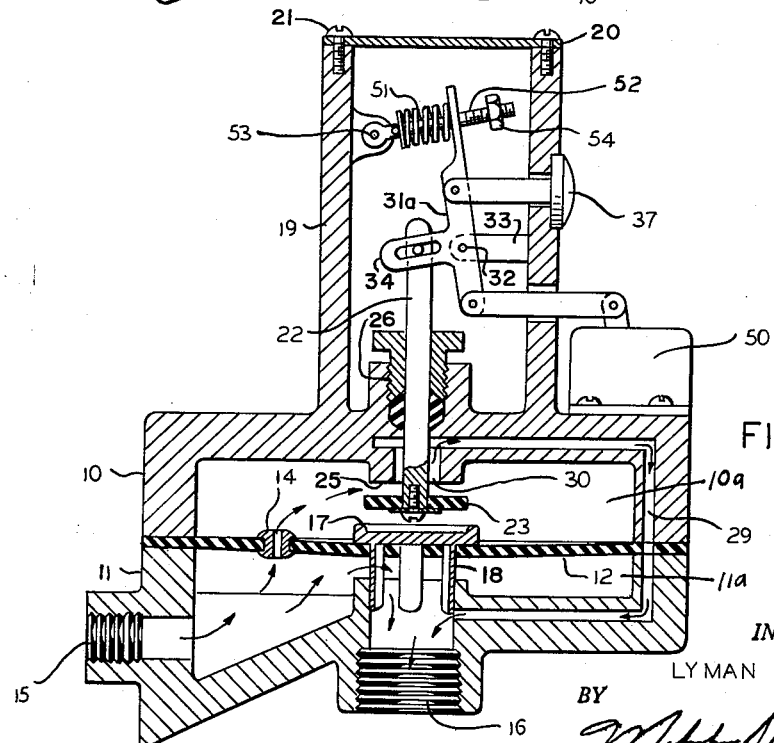

Other objects of the invention will be apparent from the following specification when taken with the accompanying drawings in which:

FIGURE 1 is a vertical cross-section of a further form of a valve in a closed position and equipped with a spring actuated escapement movement for regulating the time interval over which the valve is held in an open position; and FIGURE 2 is a similar view of the valve shown in FIGURE 1 in an open position.

Similar characters of reference indicate corresponding parts throughout the several views, and referring now to the same, the character 10 designates the top or upper portion of the valve enclosure or body, and the character 11 designates the lower section of the valve body. Obviously these upper and lower sections 10 and 11, respectively, may be attached to one another in any conventional and practical manner.

A valve closing member in the form of a diaphragm 12 is disposed between the sections 10 and 11, and held in engagement thereby on their flat surfaces 13 extending around their entire outer edges. The diaphragm 12 is constructed of pliable material such as rubber or the like, and has a restricted by-pass opening 14 extending therethrough to allow flow from the inlet to the space above member 12.

The member 12 thus divides the space within the body defined by the two sections into a fluid inlet chamber 11a on one side of the member and a second chamber 10a on the other side of the member. It should be noted that the area of the member exposed to the pressure in chamber 10a is larger than the area exposed to the pressure in chamber 11a so that when the pressures in the two chambers are equal, the member 12 will be closed upon its seat.

The lower section 11 of the valve enclosure is equipped with a threaded inlet 15 and a threaded outlet 16, and a valve member 17 consisting of a flat disc having downwardly extending guides 18, is disposed centrally within the diaphragm 12, and the guides 18 slidably engage the inner surface of the outlet 16.

The upper section 10 of the valve enclosure has an operating housing 19 extending upward therefrom, the upper end of which housing is provided with a cover diagrammatically represented at 20 and shown held in position by means of the screws 21.

A vertical valve stem 22 extends centrally through the top of the upper portion 10 and supports a relief valve member 23 at its lower end, the valve 23 being attached to the stem 22 by means of the screw 24. The valve 23 engages a seat 25 forming an integral part of the upper wall of section 10. The upper face of the section 10 has an upwardly extending threaded portion 26 surrounding the stem 22 and supporting a threaded stuffing nut 27 which is employed for retaining a packing 28 within the portion 26 to seal the opening between the slidable stem 22 and the section 10.

A tubular relief duct or passage 29 extends from the opening 30 of the upper section 10, to the outlet 16 of the lower section 11. This duct 29 is shown disposed within the walls of the upper and lower sections 10 and 11 respectively. It will be noted that the diaphragm 12 is equipped with an aperture 31 to prevent obstruction of, and in direct alignment with, the duct 29.

An actuating lever 31a in the form of a rocker link is pivotally supported intermediate its ends at 32 by an arm 33 extending into the housing 19. The lever 31 has one arm 34 thereof equipped with an elongated slot 35 engaging a pin 36 in the upper end of the valve stem 22.

A push button 37 is slidably mounted in the wall of housing 19 and pivoted to rocker arm 31a in a manner such that inward movement of the push button 37 causes counter-clockwise rotation of arm 31a, depression of stem 32, and opening of the relief valve 30 so as to cause opening movement of the main valve.

An escapement or time delay mechanism 50 has the actuating lever 50a thereof interconnected with the rocker arm 31a through a link 50b.

The inward opening movement of button 37 is opposed by a resilient means in the form of a coiled compression spring 51. Spring 51 encircles a stop rod 52 which is pivotally mounted on housing 19 as at 53. One end of the spring 51 bears against an abutment 52a on rod 52 and the other end bears against an extended portion 52b of rocker arm 31. Rod 52 extends through an opening in the portion 52b and carries a stop nut 54 which limits closing movement of rocker arm 31a to the position illustrated in FIGURE 1.

The operator desiring to open the main valve, pushes inwardly on the push button 37 against the bias of spring 51 and thereby opens the relief valve as seen in FIGURE 2. The actuating lever 50a of the escapement mechanism moves to the right, thus setting up a selected time delay before the valve is closed. After the time interval has passed, the rocker arm is allowed to return to the closed position under the influence of spring 51.

The time delay mechanism may take any one of several known forms in which movement of the actuating lever thereof in one direction, as to the right in the drawings is substantially unimpeded while return movement is retarded or obstructed by a "latching" arrangement until the passage of a selected time interval. Since time delay mechanisms of this type are well known to the art, for example, time delay mechanisms incorporating latch type releasing and escapement mechanisms of the general types shown in the patents to A. C. Grunwald 2,298,882, C. R. Turner 2,595,313 and R. G. Birr 2,691,561, it is believed unnecessary to illustrate the same in detail.

When the operator desires to operate the valve, he pushes inwardly on the push button 37 against the bias of spring 51. This causes opening of the relief valve 30 and causes movement of the escapement mechanism 50 as by moving actuating arm 50a thereof to the right in FIGURE 1. The escapement mechanism 50 holds the link 50a in the "open" position as illustrated in FIGURE 2 until a predetermined time interval has passed. Thereafter, the mechanism 50 relieves the link 50a so that it may move to the closed position shown in FIGURE 1 under the influence of a biasing spring 51.

The particular form of mechanism shown herein is positive in action in that the push button 37 and the relief valve operating linkage impart a positive opening thrust to the relief valve. Thus, "chattering" of the relief valve is avoided.

The valve shown and described herein is particularly well suited for high pressure or large quantity flow installation, while at the same time requires relatively small amount of operator force for the actuation.

Whereas I have shown and described an operative form of my invention, I wish it to be understood that this showing is to be taken in an illustrative or diagrammatic sense only. There are many modifications to the invention which will be apparent to those skilled in the art and which will fall within the scope and spirit of the invention. The scope of the invention should be limited only by the scope of the hereinafter appended claim.

I claim:

In an operating system for valves of the differential pressure type having a main valve body with an inlet and an outlet therein and a main valve closing member dividing an operating space in said body into an inlet pressure chamber and a second chamber, restricted means allowing communication between said chambers, the valve closing member being adapted to seat upon and close said outlet in response to a build up in pressure in said second chamber, the improvement comprising a pressure relief passage of larger cross sectional area than said restricted means for said second chamber, and a valve closing member adapted in one position thereof to close said passage and in another position thereof to open said passage to the second chamber to thereby allow opening of said main valve closing member, an operating stem for said valve closing member, a rocker arm mounted for pivotal movement on said valve body, said rocker arm having a pin and slot connection with said operating stem, a push button slidably mounted on said valve body and pivoted to said rocker arm, whereby inward movement of said push button causes opening movement of said valve closing member, a spring connected between said valve body and said rocker arm and opposing said opening movement of said rocker arm and valve closing member, and a linkage interconnecting said rocker arm with an automatic time delay mechanism, said time delay mechanism automatically holding said rocker arm and said valve closing member locked in the fully open position, for a selected time interval.

References Cited in the file of this patent

UNITED STATES PATENTS

| | | |
|---|---|---|
| 1,465,575 | Berg | Aug. 21, 1923 |
| 1,907,683 | Tews | May 9, 1933 |
| 2,764,994 | Nelson | Oct. 2, 1956 |
| 2,772,067 | Wilson | Nov. 27, 1956 |
| 2,778,789 | Asplund | Apr. 16, 1957 |

FOREIGN PATENTS

| | | |
|---|---|---|
| 663,945 | Great Britain | Jan. 2, 1952 |